United States Patent
Chen et al.

(10) Patent No.: US 12,162,593 B2
(45) Date of Patent: Dec. 10, 2024

(54) ROTOR MOUNT ASSEMBLY

(71) Applicant: SZ DJI TECHNOLOGY CO., LTD., Shenzhen (CN)

(72) Inventors: Peng Chen, Shenzhen (CN); Jianda Qiu, Shenzhen (CN); Qi Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 733 days.

(21) Appl. No.: 17/035,380

(22) Filed: Sep. 28, 2020

(65) Prior Publication Data

US 2021/0024204 A1    Jan. 28, 2021

Related U.S. Application Data

(63) Continuation of application No. PCT/CN2019/114057, filed on Oct. 29, 2019.

(51) Int. Cl.
| | |
|---|---|
| *B64U 20/00* | (2023.01) |
| *B64C 27/32* | (2006.01) |
| *B64U 30/20* | (2023.01) |
| *B64U 50/19* | (2023.01) |

(52) U.S. Cl.
CPC ............ *B64C 27/322* (2013.01); *B64U 30/20* (2023.01); *B64U 50/19* (2023.01)

(58) Field of Classification Search
CPC ......... B64C 11/02; B64C 11/04; B64C 27/08; B64C 27/14; B64C 27/32; B64C 39/024; B64U 10/13; B64U 30/20; B64U 10/10; F01D 5/021; F01D 5/025; F04D 29/20;
(Continued)

(56) References Cited

U.S. PATENT DOCUMENTS

| | | | |
|---|---|---|---|
| 2014/0356174 A1* | 12/2014 | Wang | B64C 11/04 |
| | | | 416/204 R |
| 2015/0129711 A1* | 5/2015 | Caubel | B64C 27/08 |
| | | | 244/17.23 |

(Continued)

FOREIGN PATENT DOCUMENTS

| | | |
|---|---|---|
| CN | 205499359 U | 8/2016 |
| CN | 106628165 A | 5/2017 |

(Continued)

OTHER PUBLICATIONS

The World Intellectual Property Organization (WIPO) International Search Report and Written Opinion for PCT/CN2019/114057 Aug. 5, 2020 10 pages.

*Primary Examiner* — Matthew T Largi
(74) *Attorney, Agent, or Firm* — ANOVA LAW GROUP, PLLC

(57) ABSTRACT

An unmanned aerial vehicle (UAV) including a fuselage frame and a propulsion system coupled to the fuselage frame. The propulsion system includes a first propulsion device and a second propulsion device. The first propulsion device includes a first rotor blade assembly and a first rotor mount assembly, and the second propulsion device includes a second rotor blade assembly and a second rotor mount assembly. The first rotor mount assembly is configured to not allow the second rotor blade assembly to be assembled to the first rotor mount assembly.

20 Claims, 14 Drawing Sheets

(58) Field of Classification Search
CPC .... F04D 29/263; F04D 29/266; F04D 29/322; F04D 29/325; F04D 29/34; F04D 29/646
See application file for complete search history.

(56) References Cited

U.S. PATENT DOCUMENTS

| | | | |
|---|---|---|---|
| 2016/0001879 A1* | 1/2016 | Johannesson | B64C 27/50 416/142 |
| 2019/0055003 A1* | 2/2019 | Luo | B64C 11/28 |
| 2019/0263501 A1 | 8/2019 | Wang et al. | |
| 2020/0262541 A1* | 8/2020 | Jiang | B64C 39/024 |
| 2020/0324888 A1* | 10/2020 | Zhang | B64U 50/14 |

FOREIGN PATENT DOCUMENTS

| | | | | |
|---|---|---|---|---|
| CN | 107264784 A | 10/2017 | | |
| CN | 108583864 A | 9/2018 | | |
| CN | 108791841 A | 11/2018 | | |
| CN | 208576724 U | 3/2019 | | |
| CN | 109823517 A | 5/2019 | | |
| WO | 2018090281 A1 | 5/2018 | | |
| WO | 2019082044 A1 | 5/2019 | | |
| WO | WO-2019128298 A1 * | 7/2019 | ............. | B64C 11/02 |
| WO | WO-2021035631 A1 * | 3/2021 | | |

\* cited by examiner

ROTOR MOUNT ASSEMBLY

CROSS-REFERENCE TO RELATED APPLICATION

This application is a continuation of International Application No. PCT/CN2019/114057, filed Oct. 29, 2019, the entire content of which is incorporated herein by reference.

TECHNICAL FIELD

The present disclosure relates to technologies related to aerial vehicle (UAV) and, more particularly, to a rotor mount assembly, and a propulsion system and a UAV having the rotor mount assembly.

BACKGROUND

An unmanned aerial vehicle (UAV) uses rotor-based propulsion system to provide a lift force for the UAV to fly in the air and move forward and backward. The propulsion system usually includes a plurality of rotor blade assemblies, such as four, six, or eight rotor blade assemblies, each of which is mounted to a body of the UAV or an arm of the UAV via a rotor mount assembly.
In conventional technologies, the rotor mount assembly and the corresponding rotor blade assembly have matching portions that match each other for clamping and fixing the rotor blade assembly to the rotor mount assembly. The mating surface of such matching portions are easily worn out, reducing the reliability of the protrusion system.

SUMMARY

In accordance with the present disclosure, there is provided a rotor mount assembly including a rotor seat and a resilient member. The rotor seat includes a base and a lock structure arranged at the base. The lock structure includes a recess opening towards the base and configured to receive a portion of a rotor blade assembly. The resilient member is configured to provide an elastic force to the portion of the rotor blade assembly to constrain the portion of the rotor blade assembly in the recess.

Also in accordance with the present disclosure, there is provided a rotor seat including a base, a first lock structure arranged at the base and including a first recess opening towards the base, and a second lock structure arranged at the base and including a second recess opening towards the base.

Also in accordance with the present disclosure, there is provided a propulsion device including a rotor blade assembly and a rotor mount assembly. The rotor mount assembly includes a rotor seat and a resilient member. The rotor seat includes a base, a first lock structure arranged at the base, and a second lock structure arranged at the base. The first lock structure includes a first recess opening towards the base and is configured to receive a first part of the portion of the rotor blade assembly. The second lock structure includes a second recess opening towards the base and is configured to receive a second part of the portion of the rotor blade assembly. The resilient member is configured to provide an elastic force to the portion of the rotor blade assembly to constrain the portion of the rotor blade assembly in the first recess and the second recess.

Also in accordance with the present disclosure, there is provided a propulsion system including a first propulsion device and a second propulsion device. The first propulsion device includes a first rotor blade assembly and a first rotor mount assembly. The first rotor blade assembly includes a first portion. The first rotor mount assembly includes a first rotor seat and a first resilient member. The first rotor seat includes a first base, a first lock structure arranged at the first base, and a second lock structure arranged at the first base. The first lock structure includes a first recess opening towards the first base and is configured to receive a first part of the first portion. The second lock structure includes a second recess opening towards the first base and is configured to receive a second part of the first portion. The first resilient member is configured to provide an elastic force to the first portion to constrain the first portion in the first recess and the second recess. The second propulsion device includes a second rotor blade assembly and a second rotor mount assembly. The second rotor blade assembly includes a second portion. The second rotor mount assembly includes a second rotor seat and a second resilient member. The second rotor seat includes a second base, a third lock structure arranged at the second base, and a fourth lock structure arranged at the second base. The third lock structure includes a third recess opening towards the second base and is configured to receive a first part of the second portion. The fourth lock structure includes a fourth recess opening towards the second base and is configured to receive a second part of the second portion. The second resilient member is configured to provide an elastic force to the second portion to constrain the second portion in the third recess and the fourth recess.

Also in accordance with the present disclosure, there is provided an unmanned aerial vehicle including a fuselage frame and a propulsion system coupled to the fuselage frame. The propulsion system includes a first propulsion device and a second propulsion device. The first propulsion device includes a first rotor blade assembly and a first rotor mount assembly. The first rotor blade assembly includes a first portion. The first rotor mount assembly includes a first rotor seat and a first resilient member. The first rotor seat includes a first base, a first lock structure arranged at the first base, and a second lock structure arranged at the first base. The first lock structure includes a first recess opening towards the first base and is configured to receive a first part of the first portion. The second lock structure includes a second recess opening towards the first base and is configured to receive a second part of the first portion. The first resilient member is configured to provide an elastic force to the first portion to constrain the first portion in the first recess and the second recess. The second propulsion device includes a second rotor blade assembly and a second rotor mount assembly. The second rotor blade assembly includes a second portion. The second rotor mount assembly includes a second rotor seat and a second resilient member. The second rotor seat includes a second base, a third lock structure arranged at the second base, and a fourth lock structure arranged at the second base. The third lock structure includes a third recess opening towards the second base and is configured to receive a first part of the second portion. The fourth lock structure includes a fourth recess opening towards the second base and is configured to receive a second part of the second portion. The second resilient member is configured to provide an elastic force to the second portion to constrain the second portion in the third recess and the fourth recess.

Also in accordance with the present disclosure, there is provided a rotor mount assembly for a UAV including a base and a plurality of cantilevered structures disposed on the base. Each cantilevered structure includes an arm and is configured to receive a portion of a rotor blade assembly of the UAV.

DESCRIPTION OF THE EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings and the specification to refer to the same or like parts.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Figure 1A:
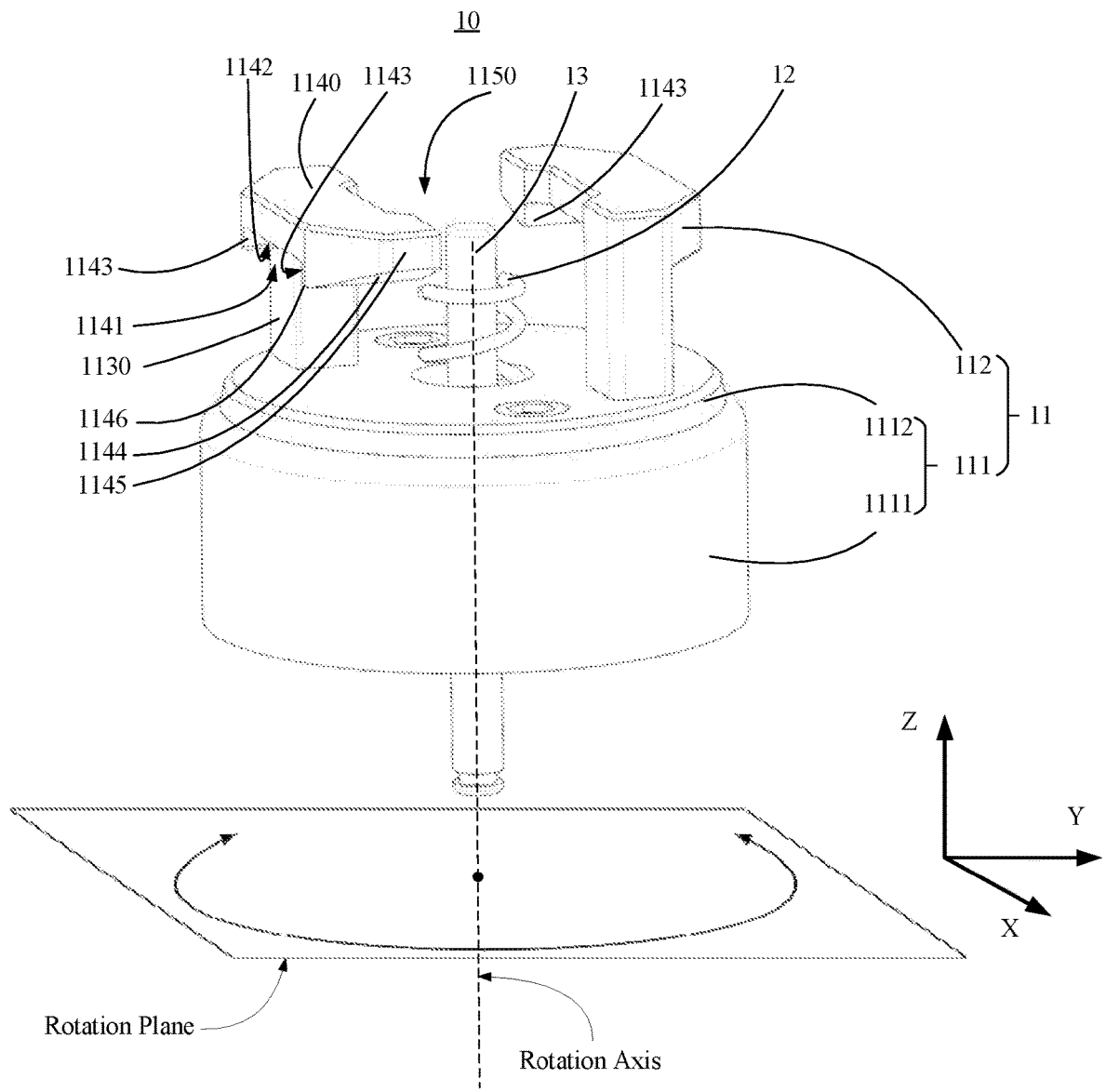
FIGS. 1A-1C schematically show an example rotor mount assembly consistent with the disclosure.
Figure 1B:
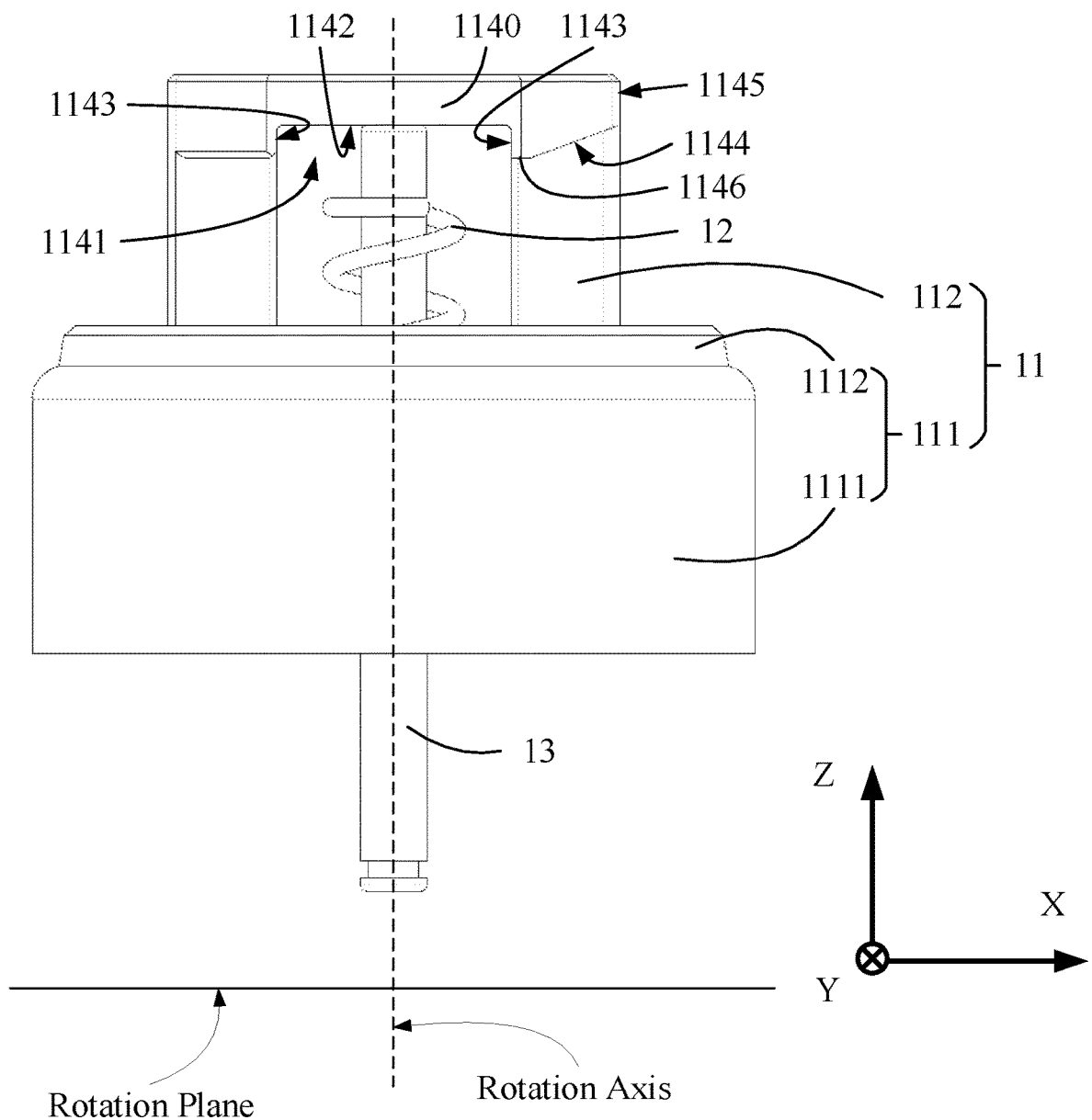
Figure 1C:
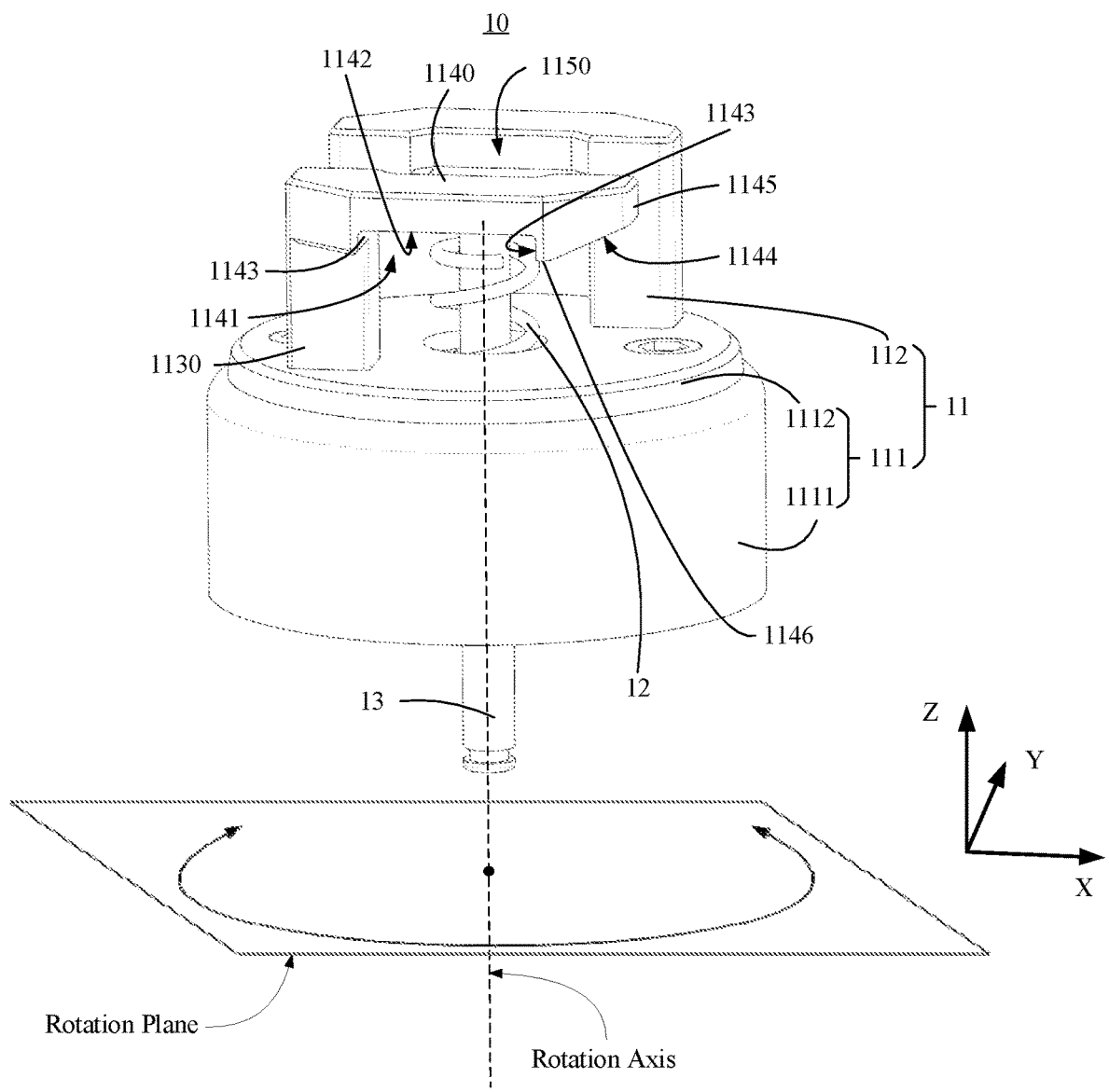

FIG. 1A is a perspective view of an example rotor mount assembly 10 consistent with embodiments of the disclosure. FIG. 1B is a side view of the rotor mount assembly 10. FIG. 1C is another perspective view of the rotor mount assembly 10 from another viewing angle. The rotor mount assembly 10 can be used in a propulsion system of a rotor-based aerial vehicle, such as a rotor-based unmanned aerial vehicle (UAV). The UAV can be, for example, a single rotor UAV or a multi-rotor UAV, such as a two-rotor UAV, a three-rotor UAV, a four-rotor UAV, a six-rotor UAV, an eight-rotor UAV, etc. The rotor mount assembly 10 can be used to mount a rotor blade assembly (not shown in FIGS. 1A-1C) and can drive the rotor blade assembly to rotate so as to provide a lift force for the aerial vehicle.

As shown in FIGS. 1A-1C, the rotor mount assembly 10 includes a rotor seat 11 and a resilient member 12. The rotor seat 11 includes a base 111 and a plurality of lock structures 112 arranged at the base 111. The plurality of lock structures 112 can cooperate with the resilient member 12 to lock the rotor blade assembly to the rotor mount assembly 10. Mounting of the rotor blade assembly to the rotor mount assembly 10 will be described in more detail later in the specification.

In some embodiments, a top surface of the base 111 or a portion of the top surface of the base 111 can approximately coincide with or be approximately parallel to a rotation plane of the rotor mount assembly 10. The rotation plane of the rotor mount assembly 10 may refer to a plane defined by a movement path of any point on the rotor mount assembly 10 while the rotor mount assembly 10 rotates, i.e., the plane on which the movement path of such point lies. In some other embodiments, the top surface of the base 111 can include a planar surface or a planar portion that is not parallel to the rotation plane of the rotor mount assembly 10. In some embodiments, the top surface of the base 111 can include a non-planar surface or a non-planar portion. The non-planar surface or non-planar portion can be convex or partially convex, or concave or partially concave, or partially convex and partially concave.

In some embodiments, as shown in FIGS. 1A-1C, the base 111 includes a motor 1111 and a fixation member 1112. The motor 1111 can drive the rotor mount assembly 10, and hence the rotor blade assembly mounted thereto, to rotate, so as to provide the lift force for the aerial vehicle. The motor 1111 can be, for example, an outer rotor motor in which the motor rotor (also referred to as a "rotator") of the motor 1111 is configured to surround the stator of the motor 1111.

The fixation member 1112 can include a board or a plate, and can be fixed to the motor 1111 by various means, such as one or more screws. In the example shown in FIGS. 1A-1C, the plurality of lock structures 112 are arranged on and fixed to the fixation member 1112. In some other embodiments, the base 111 may not include the fixation member 1112 and the plurality of lock structures 112 can be directly arranged on and fixed to the motor 1111. For example, the plurality of lock structures 112 can be directly arranged on and fixed to the rotator of the motor 1111 or another component, such as a housing, of the motor 1111 that is connected to the rotator of the motor 1111.

In some embodiments, as shown in FIGS. 1A-1C, the plurality of lock structures 112 are arranged along a peripheral portion of the base 111. In some embodiments, the plurality of lock structures 112 can be identical or approximately identical to each other. Further, the plurality of lock structures 112 can be arranged axis-symmetrically with respect to a rotation axis of the rotor mount assembly 10, which can also be the rotation axis of the base 111. In some embodiments, one or more of the plurality of lock structures 112 can be mirror symmetric to another one or more of the plurality of lock structures 112 with respect to a plane on which the rotation axis of the rotor mount assembly 10 lies.

In some embodiments, the plurality of lock structures 112 can be separate structures not connected to each other except for being both arranged on the base 111, as shown in FIGS. 1A-1C. In some other embodiments, some or all of the plurality of lock structures 112 can be connected to each other via a component other than the base 111, such as a guard ring or a reinforcement structure arranged above the base 111.

In the example shown in FIGS. 1A-1C, the rotor mount assembly 10 includes two lock structures 112. In this disclosure, the two lock structures 112 of the same rotor mount assembly 10 can also be referred to as a first lock structure and a second lock structure, respectively. The two lock structures 112 can be arranged axis-symmetrically to each other with respect to the rotation axis of the rotor mount assembly 10. In some other embodiments, the rotor mount assembly 10 can include one lock structure 112, or can include three or more lock structures 112.

In some embodiments, as shown in FIGS. 1A-1C, each of the lock structures 112 includes a cantilevered structure. The cantilevered structure includes a support member 1130 extending from the base 111 and an extension 1140 connected to the support member 1130. A first end of the support member 1130 can be connected to the base 111, i.e., contacting the base 111. The extension 1140 can be connected to the support member 1130 at a second end of the support member 1130 that is opposite to the first end, or at any proper location between the first end and the second end of the support member 1130, such as a location close to the second end of the support member 1130.

In some embodiments, the support member 1130 can include a pillar protruding from the base with a first end of the pillar connected to the base. In some embodiments, the support member 1130, such as the pillar, can be approximately perpendicular to the rotation plane of the rotor mount assembly 10. In some other embodiments, the support member 1130, such as the pillar, can form an angle with respect to the rotation plane of the rotor mount assembly 10 that is smaller than 90° but larger than 0°. The angle can be, for example, 45°, 60°, or 80°.

The support member 1130 does not have to be a pillar, but can have any other form that is suitable for supporting the extension 1140. For example, the support member 1130 can be formed by two or more pillars, can have a wholly or partially curved shape such as an arc shape, can have a shape including one or more curves, or can include two or more substantially straight components connected one after another. In some embodiments, the support member 1130 can have a hollow construction.

The extension 1140 can be in the form of an arm structure, such as including an arm. In some embodiments, the arm can include a beam. The extension 1140, such as the arm, can be rigid or elastic, e.g., the extension 1140, such as the arm, can be made of a rigid material such as metal or hard plastic, or be made of an elastic material such as rubber.

The extension 1140, such as the arm, can extend approximately laterally from the support member 1130. That is, a first end of the extension 1140 can be coupled to the support member 1130 (and hence coupled to the base 111 through the support member 1130), and a second end of the extension 1140 that is opposite to the first end of the extension 1140 is spaced apart from the base 111. As such, the support member 1130 and the extension 1140 can form a cantilevered structure.

In some embodiments, the extension 1140 can be approximately perpendicular to the support member 1130 and/or approximately parallel to the rotation plane of the rotor mount assembly 10. The extension 1140 being parallel to the rotation plane of the rotor mount assembly 10 may refer to the extension 1140 as a whole being approximately parallel to the rotation plane of the rotor mount assembly 10 or a major portion of the extension 1140 being approximately parallel to the rotation plane of the rotor mount assembly 10. In some other embodiments, the extension 1140, such as the arm, may form an angle with respect to the rotation plane of the rotor mount assembly 10. The angle can be, for example, larger than about 0° and smaller than about 90°.

In some embodiments, the extension 1140, such as the arm, can be curved. In some embodiments, the extension 1140, such as the arm, can be curved in one or more directions, such as in one or more of a direction approximately perpendicular to the rotation plane of the rotor mount assembly 10 (e.g., the Z direction in FIGS. 1A-1C) and a direction approximately parallel to the rotation plane of the rotor mount assembly 10 (e.g., the Y direction in FIGS. 1A-1C).

Consistent with embodiments of the disclosure, each of the lock structures 112 (such as the cantilevered structures) of the rotor mount assembly 10 can be configured to wrap around a portion of the rotor blade assembly so as to mount and fix the rotor blade assembly to the rotor mount assembly 10. The portion of the rotor blade assembly is also referred to as a "mount portion" or a "lock portion," and can include, for example, a center portion of the rotor blade assembly. In some embodiments, the rotor blade assembly can include a foldable rotor blade assembly including two rotor blades connected to each other via a hub, also referred to as a "connect portion." In these embodiments, the mount portion of the rotor blade assembly for wrapping by the lock structures 112 can be the hub.

The mount portion of the rotor blade assembly can be received by the extension 1140, e.g., by the arm. In some embodiments, as shown in FIGS. 1A-1C, the extension 1140 includes a recess 1141. The recess 1141 can include, for example, a groove that extends laterally across the extension 1140. The recess 1141 opens towards the base 111 and is configured to receive the mount portion of the rotor blade assembly.

As shown in FIGS. 1A-1C, the recess 1141 includes a bottom surface 1142 and two side surfaces 1143 extending from the bottom surface 1142 towards a top surface of the base 111. The bottom surface 1142 can be approximately parallel to the rotation plane of the rotor mount assembly 10. The two side surfaces 1143 can be approximately parallel to each other. In some embodiments, the two side surfaces 1143 can be approximately perpendicular to the rotation plane of the rotor mount assembly 10.

In some embodiments, a first one of the side surfaces 1143 can be continuously connected to a side surface of the support member 1130. In other words, the first one of the side surfaces 1143 can be considered as extending to the base 111. A second one of the side surfaces 1143 can be spaced apart from the base 111. As such, an opening, also referred to as a "vertical opening," can be formed between the second one of the side surfaces 1143 and the base 111. The opening can allow the mount portion of the rotor blade assembly to pass through and then to be received in the recess 1141 during the process of mounting the rotor blade assembly to the rotor mount assembly 10, which will be described in more detail later in the disclosure.

In some embodiments, as shown in FIGS. 1A-1C, the lock structure 112 further includes an inclined surface 1144 extending from an outer side surface 1145 of the lock structure 112 towards a top 1146 of the recess 1141. The inclined surface 1144 can be inclined with respect to the rotation plane of the rotor mount assembly 10 at an angle larger than 0° and smaller than 90°. For example, the angle between the inclined surface 1144 and the rotation plane of the rotor mount assembly 10 can be in a range from about 10° to about 45°, such as about 15°, about 20°, about 25°, about 30°, about 35°, about 40° or about 45°. The inclined surface 1144 can allow the mount portion of the rotor blade assembly to be more easily and/or smoothly rotated to the opening between the second one of the side surfaces 1143 and the base 111 and into the recess 1141.

In the example shown in FIGS. 1A-1C, the rotor mount assembly 10 includes two lock structures 112 arranged along the peripheral portion of the base 111 and arranged axis-symmetrically with respect to the rotation axis of the rotor mount assembly 10. In some embodiments, the two lock structures 112 can be identical or almost identical to each other. For example, the dimensions of various corresponding portions of the two lock structures 112 can be approximately the same.

In some embodiments, the support members 1130 of the two lock structures 112 can be approximately parallel to each other. In some embodiments, the extensions 1140 of the two lock structures 112 can be approximately parallel to each other and extend from one end of respectively support members 1130 in approximately opposite directions. For example, as shown in FIGS. 1A and 1C, one of the two extensions 1140 extends in the positive X direction and the other one of the two extensions 1140 extends in the negative X direction.

As shown in FIGS. 1A and 1C, the two lock structures 112, and hence the two extensions 1140 thereof, are spaced apart from each other. An opening 1150, also referred to as a horizontal opening or a trench, is formed between the two lock structures 112, e.g., between the extensions 1140 of the two lock structures 112. In some embodiments, the opening 1150 can extend in a direction parallel to an extension direction of the extensions 1140. For example, as shown in FIGS. 1A and 1C, the opening 1150 and the extensions 1140 can all extend along the X direction in the figure. In some other embodiments, the extension direction of the opening 1150 and the extension direction of the extensions 1140 can form an angle larger than 0° and smaller than 90°.

The opening 1150 is configured to receive the mount portion of the rotor blade assembly, and allow the mount portion of the rotor blade assembly to pass through and rotate to a position to be received, e.g., wrapped around, by the lock structures 112. In some embodiments, a width of the opening 1150 can be larger than a width of the mount portion of the rotor blade assembly to allow the mount portion of the rotor blade assembly to pass through. In some embodiments, the width of the opening 1150 can be approximately the same or slightly larger than the width of the mount portion of the rotor blade assembly. For example, the width of the opening 1150 can be approximately 1%, approximately 5%, or approximately 10% larger than the width of the mount portion of the rotor blade assembly.

As shown in FIG. 1A, each of the two extensions 1140 of the two lock structures 112 includes a recess 1141 that opens towards the base 111. The two recesses 1141 can each be configured to receive a respective part of the mount portion of the rotor blade assembly. For example, one of the two recesses 1141 can be configured to receive a first part of the mount portion that includes or is close to a first end of the mount portion, and the other one of the two recesses 1141 can be configured to receive a second part of the mount portion that includes or is close to a second end of the mount portion that is opposite to the first end. The mount portion of the rotor blade assembly can be inserted into the opening 1150 and pressed down through the opening 1150 and beyond the extensions 1140 (e.g., beyond the tops 1146 of the extensions 1140), rotated to pass through the openings each between the second one of the side surfaces 1143 of the corresponding extension 1140 and the base 111, and then pushed into the recesses 1141 by the resilient member 12. In some embodiments, the opening between the second one of the side surfaces 1143 of an extension 1140 and the base 111 can also be an opening between the top 1146 of the extension 1140 and the base 111.

In some embodiments, the recesses 1141 of the two lock structures 112 can be approximately symmetric to each other with respect to the rotation axis of the rotor mount assembly 10. In some embodiments, the recesses 1141 of the two lock structures 112 can be approximately parallel to each other, for example, in their lateral directions (also referred to as "width directions"). In the example shown in FIGS. 1A-1C, the lateral directions of the recesses 1141 can be along the X direction in the figures. In some embodiments, each of the two recesses 1141 can extend and run through a width direction of the corresponding extension 1140 and such a direction is also referred to as a longitudinal direction (also referred to as a "length direction") of the recess 1141. In the example shown in FIGS. 1A-1C, the longitudinal directions of the recesses 1141 can be along the Y direction in the figures. Each of the recesses 1141 can be symmetric with respect to a middle plane of the corresponding recess 1141. Such a middle plane is also referred to as a longitudinal plane of symmetry of the corresponding recess 1141. In some embodiments, the longitudinal planes of symmetry of the two recesses 1141 can approximately coincide with each other.

The extension direction, i.e., the longitudinal direction, of the recesses 1141 can be along a first direction and the extension direction of the opening 1150 can be along a second direction. In some embodiments, the first direction can be not parallel to the first direction. In some embodiments, the first direction can be approximately perpendicular to the second direction. For example, the first direction can be along the Y direction in FIGS. 1A-1C and the second direction can be along the X direction in FIGS. 1A-1C.

Consistent with embodiments of the disclosure, the resilient member 12 can be configured to provide an elastic force to the mount portion of the rotor blade assembly to push the mount portion of the rotor blade assembly to abut the bottom surface(s) 1142 of the recess(es) 1141, so as to constrain the mount portion of the rotor blade assembly in the recess(es) 1141. As such, the rotor blade assembly can be mounted and fixed to the rotor mount assembly 10. In some embodiments, the resilient member 12 can be disposed at the top surface and be configured to abut the mount portion of the rotor blade assembly to provide the elastic force to the mount portion of the rotor blade assembly.

The resilient member 12 can have a configuration that can provide the elastic force or can be made of a material that can provide the elastic force. In some embodiments, a combination of the configuration and the material of the resilient member 12 can allow the resilient member 12 to provide the elastic force. For example, the resilient member 12 can be made of an elastic material, such as elastomer or metal, or a combination of elastic materials, such as elastomer and metal. In some embodiments, the resilient member 12 can include a spring structure. For example, the resilient member 12 can include an air spring or a mechanical spring. The mechanical spring can be, e.g., a flat spring, a cantilever spring, or a coil spring as shown in FIGS. 1A-1C.

In some embodiments, as shown in FIGS. 1A-1C, the rotor mount assembly 10 further includes a shaft 13. The shaft 13 can be arranged at a center of the base 111 and be approximately perpendicular to the rotation plane of the rotor mount assembly 10. Further, an axis of the shaft 13 can coincide with the rotation axis of the rotor mount assembly 10. In some embodiments, the shaft 13 can be configured to rotate along with the motor 1111.

The shaft 13 can be configured to be inserted into a shaft hole in the mount portion of the rotor blade assembly and can help to stabilize the rotor blade assembly when the rotor mount assembly 10 drives the rotor blade assembly to rotate. In some embodiments, the shaft 13 can be positioned into the shaft hole of the rotor blade assembly. In some other embodiments, the shaft 13 can be rotated into the shaft hole of the rotor blade assembly. For example, the shaft 13 may include an external thread at the end for inserting into the shaft hole and the shaft hole can correspondingly include an internal thread matching the external thread of the shaft 13. The engagement between the external thread and the internal thread can help the rotor blade assembly to be more stably fixed to the shaft 13.

In some embodiments, as shown in FIGS. 1A-1C, the resilient member 12 can be sleeved on the shaft 13. For example, the resilient member 12 can include a coil spring and sleeved around the shaft 13.

Figure 2:
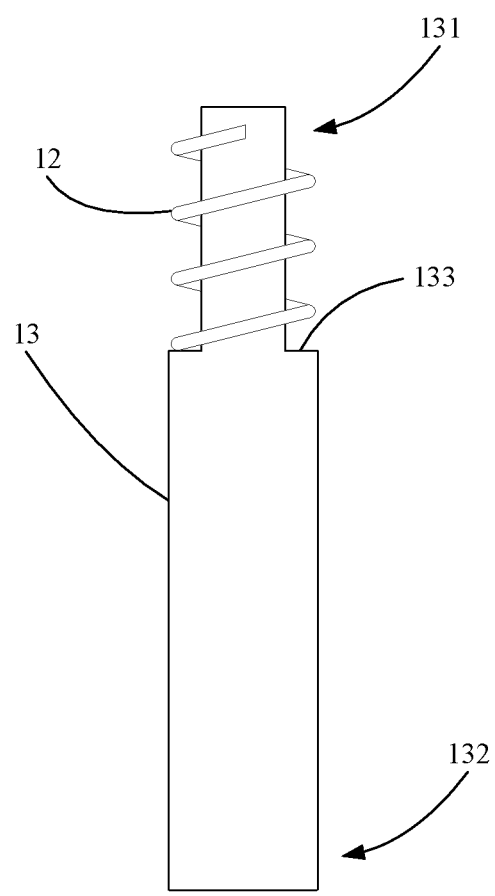
FIG. 2 is a schematic view of an example shaft consistent with the disclosure.

In some embodiments, the shaft 13 can include a simple pole structure and the resilient member 12 can abut the base 111 directly. In some embodiments, the shaft 13 can have another configuration that allow the resilient member 12 to abut the shaft 13 rather than the base 111. FIG. 2 is a schematic view of an example shaft 13 consistent with the disclosure. In the example shown in FIG. 2, the shaft 13 includes a first end 131 and a second end 132. The first end 131 can be configured to be coupled to the mount portion of the rotor blade assembly, e.g., be inserted into the shaft hole in the mount portion of the rotor blade assembly, and is also referred to as a "free end" of the shaft 13. The second end 132 can be configured to be fixed to the motor 1111 and hence can rotate along with the motor 1111, and is also referred to as a "fixed end" of the shaft 13. As shown in FIG. 2, the shaft 13 includes a step portion 133. When the rotor blade assembly is mounted, the resilient member 12 can abut between the step portion 133 and the mount portion of the rotor blade assembly. For example, one end of the resilient member 12 can abut the step portion 133 and the other end of the resilient member 12 can abut the mount portion of the rotor blade assembly.

In the embodiment shown in FIGS. 1A-1C and described above, the rotor mount assembly 10 includes the shaft 13. In some other embodiments, the rotor mount assembly 10 may not need to include a shaft and the resilient member 12 can directly abut between the base 111 and the mount portion of the rotor blade assembly without being supported or constrained by a shaft.

Figure 3:
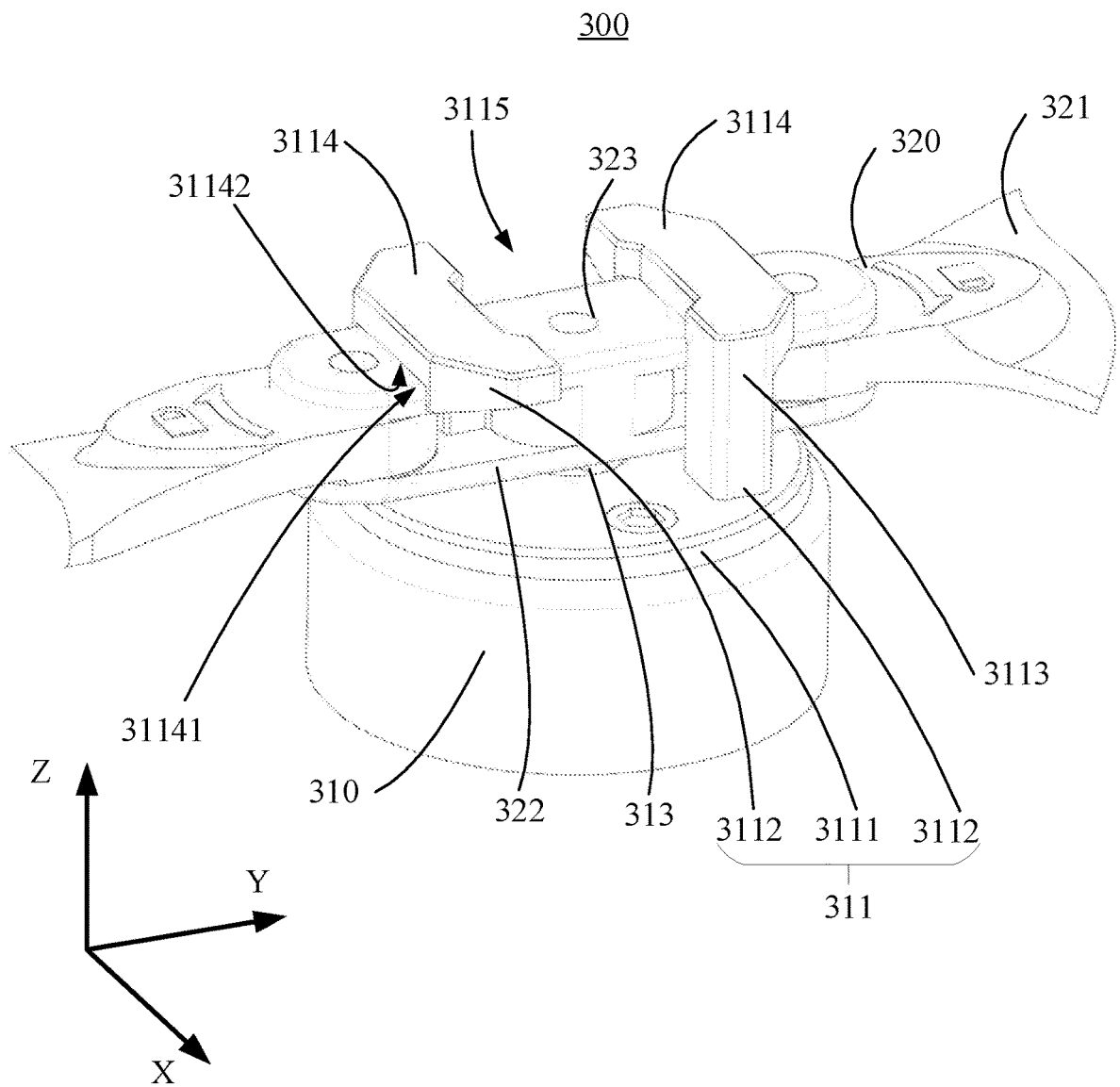
FIG. 3 schematically shows an example propulsion device consistent with the disclosure.

The rotor mount assembly consistent with the disclosure can be used to mount a rotor blade assembly to form a propulsion device that can be used on an aerial vehicle. FIG. 3 is a perspective view of an example propulsion device 300 consistent with the disclosure. The propulsion device 300 includes a rotor mount assembly 310 and a rotor blade assembly 320 mounted at the rotor mount assembly 310. The rotor mount assembly 310 can be any rotor mount assembly that is consistent with the disclosure, such as the example rotor mount assembly 10 described above in connection with FIGS. 1A-1C and 2.

As shown in FIG. 3, the rotor mount assembly 310 includes a rotor seat 311 and a resilient member (not seen in FIG. 3). The rotor seat 311 includes a base 3111 and two lock structures 3112 arranged at the base 3111. The two lock structures 3112 can cooperate with the resilient member to lock the rotor blade assembly 320 to the rotor mount assembly 310. In the example shown in FIG. 3, the rotor mount assembly 310 includes two lock structures 3112. The two lock structures 3112 can also be referred to as a first lock structure and a second lock structure, respectively. The two lock structures 3112 can be arranged axis-symmetrically to each other with respect to the rotation axis of the rotor mount assembly 310. In some other embodiments, the rotor mount assembly 310 can include one lock structure 3112 or can include three or more lock structures 3112.

In some embodiments, as shown in FIG. 3, each of the two lock structures 3112 includes a cantilevered structure. Each of the cantilevered structures includes a support member 3113 extending from the base 3111 and an extension 3114 connected to the support member 3113. Each of the extensions 3114 includes a recess 31141. Each of the recesses 31141 can include, for example, a groove that extends laterally across the corresponding extension 3114. The recesses 31141 both open towards the base 3111. The configuration of each of the lock structures 3112 can be the same as or similar to that of the lock structure 112 described above in connection with FIGS. 1A-1C and 2, and hence detailed description thereof is omitted.

Similar to the rotor mount assembly 100 described above in connection with FIGS. 1A-1C and 2, the rotor mount assembly 310 also includes an opening 3115 formed between the two lock structures 3112, e.g., between the two extensions 3114. In some embodiments, the opening 3115 can extend in a direction parallel to an extension direction of the extensions 3114. For example, as shown in FIG. 3, the opening 3115 and the extensions 3114 can all extend along the X direction in the figure. In some other embodiments, the extension direction of the opening 3115 and the extension direction of the extensions 3114 can form an angle larger than 0° and smaller than 90°.

The rotor blade assembly 320 includes two blades 321 and a mount portion 322 connecting the two blades 321. The mount portion 322 can be configured to engage the rotor mount assembly 310 to allow the rotor blade assembly 320 to be mounted at and fixed to the rotor mount assembly 310. In some embodiments, the mount portion 322 can include a center portion of the rotor blade assembly 320. In some embodiments, the rotor blade assembly 320 can include a foldable blade assembly in which the two blades 321 are connected via a hub and can rotate with respect to each other. In these embodiments, the two blades 321 can extend in opposite directions when the foldable blade assembly is in an extended state and can extend in an approximately same direction when the foldable blade assembly is in a folded state. Further, the mount portion 322 can be the hub of the foldable blade assembly.

As shown in FIG. 3, the recess 31141 of a first one of the lock structures 3112 is configured to receive a first part of the mount portion 322 and the recess 31141 of a second one of the lock structured 3112 is configured to receive a second part of the mount portion 322. In some embodiments, the first part of the mount portion 322 can include or be close to a first end of the mount portion 322 and the second part of the mount portion 322 can include or be close to a second end of the mount portion 322 that is opposite to the first end.

When the rotor blade assembly 320 is held by the recesses 31141, the resilient member can provide an elastic force to the mount portion 322 of the rotor blade assembly 320 to push the mount portion 322 to abut a bottom surface 31142 of each of the recesses 31141, so as to constrain the mount portion 322 in the recesses 31141. As such, the rotor blade assembly 320 can be mounted and fixed to the rotor mount assembly 310, as shown in FIG. 3.

To hold the mount portion 322 in the recesses 31141, a width of each of the recesses 31141 can be larger than a width of the mount portion 322. In some embodiments, the width of each of the recesses 31141 can be approximately the same or slight larger than the width of the mount portion 322. In some embodiments, the widths of the two recesses 31141 can be approximately equal to each other. Further, a depth of each of the recesses 31141 can be larger than a thickness of the mount portion 322. In some embodiments, the depth of each of the recesses 31141 can be approximately the same or slight larger than the thickness of the mount portion 322. In some embodiments, the depths of the two recesses 31141 can be approximately equal to each other.

In some embodiments, a width of the opening 3115 can be larger than the width of the mount portion 322 of the rotor blade assembly 320 to allow the mount portion 322 to pass through. In some embodiments, the width of the opening 3115 can be approximately the same or slightly larger than the width of the mount portion 322.

In some embodiments, as shown in FIG. 3, the rotor mount assembly 310 further includes a shaft 313. The shaft 313 can be arranged at a center of the base 3111 and be approximately perpendicular to the rotation plane of the rotor mount assembly 310. Correspondingly, the rotor blade assembly 320 further includes a shaft hole 323 at the mount portion 322. The shaft hole 323 is configured to receive the shaft 313. In some embodiments, the resilient member of the rotor mount assembly 310 can include a coil spring sleeved on the shaft 313.

Some features and characteristics of the rotor mount assembly 310 shown in FIG. 3 are described above. In some embodiments, the rotor mount assembly 310 can have same or similar features and/or characteristics as the rotor mount assembly 10 described above in connection with FIGS. 1A-1C and 2. Therefore, for details of the rotor mount assembly 310, such as configurations of various components thereof and functions thereof, reference can be made to the description above of the rotor mount assembly 10. Detailed description of the rotor mount assembly 310 is omitted.

Figure 4A:
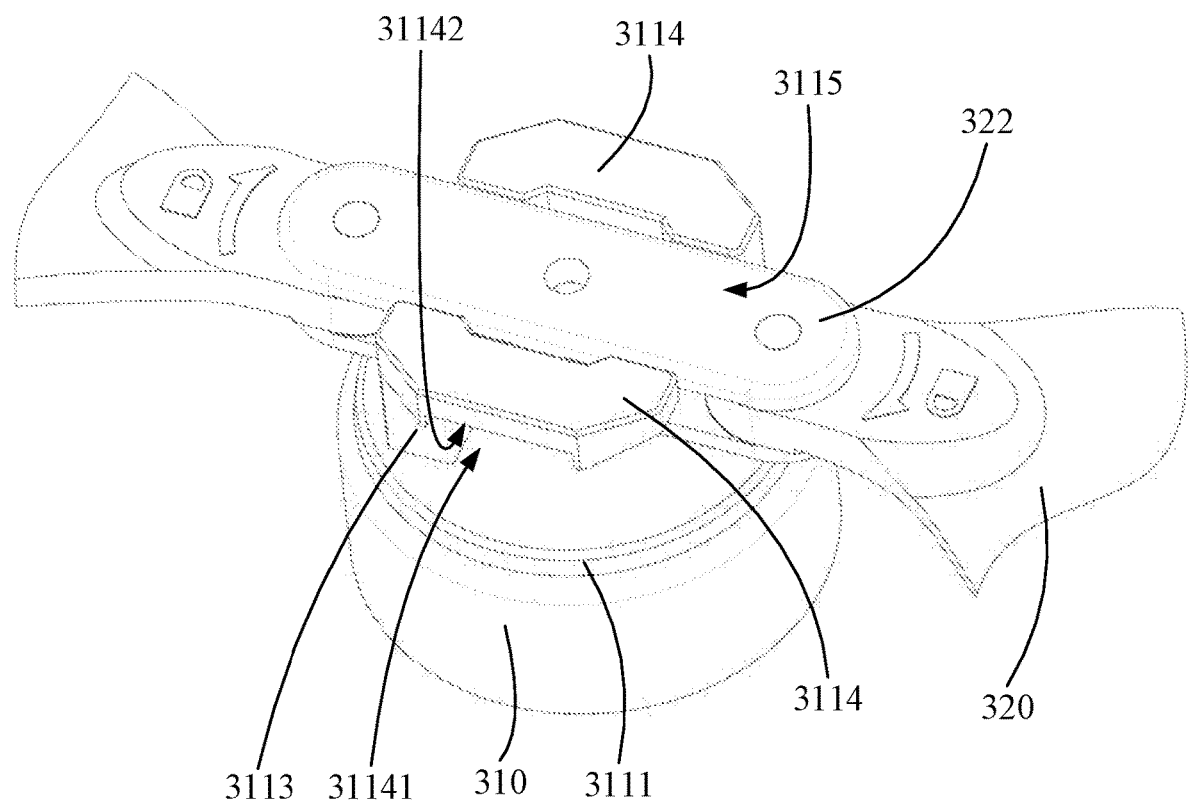
FIGS. 4A-4C schematically show an example process consistent with the disclosure of mounting a rotor blade assembly to a rotor mount assembly.
Figure 4B:
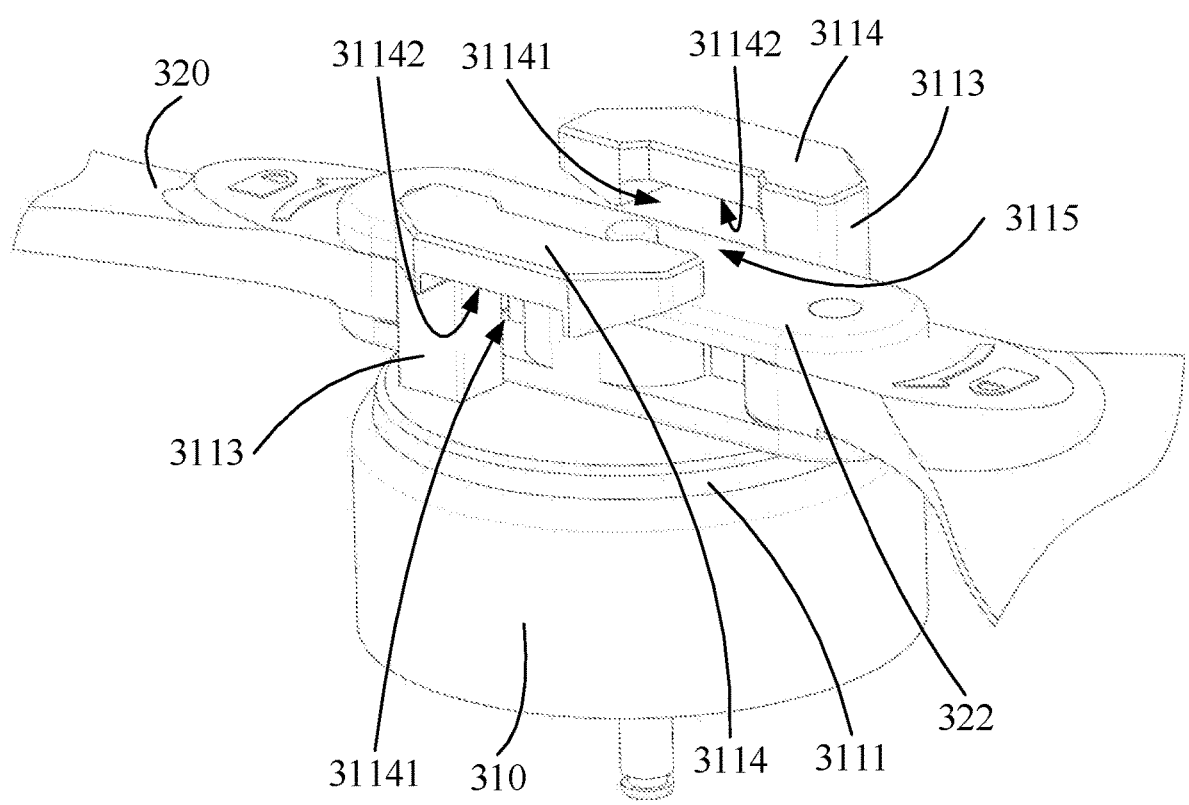
Figure 4C:
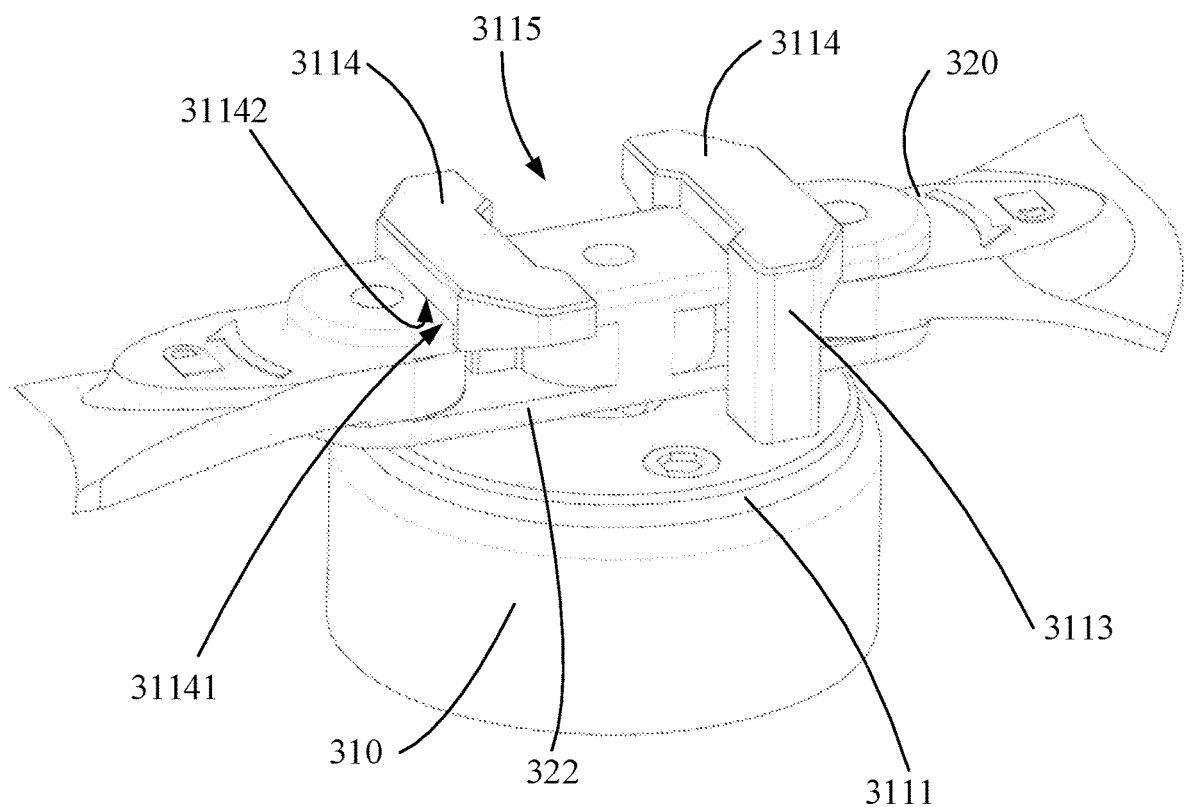

FIGS. 4A-4C schematically show a process of mounting the rotor blade assembly 320 to the rotor mount assembly 310. As shown in FIG. 4A, the rotor blade assembly 320 is placed on the rotor mount assembly 310, with the mount portion 322 of the rotor blade assembly 320 being at least partially received in the opening 3115. At this stage, the resilient member of the rotor mount assembly 310 can be in a natural stage or in a slightly compressed state, holding the mount portion 322 in the opening 3115. Then, as shown in FIG. 4B, an external force can be applied to the rotor blade assembly 320 and hence the rotor blade assembly 320 is pushed down to allow the mount portion 322 to pass beyond bottoms of the extensions 3114, e.g., beyond tops of the recesses 31141 of the extensions 3114. At this stage, the resilient member of the rotor mount assembly 310 is further compressed. In some embodiments, the rotor blade assembly 320 can be pushed down until the mount portion 322 touches the base 3111. After that, the rotor blade assembly 320 can be rotated to allow the mount portion 322 to pass through openings between the tops of the recesses 31141 and the base 3111. When the mount portion 322 reaches a limiting position, for example, when the mount portion 322 touches one or both of the support members 3113, the external force can be removed and the elastic force applied by the resilient member of the rotor mount portion 322 to the mount portion 322 can push the rotor blade assembly 320 up until the mount portion 322 touches the bottom surfaces 31142 of the recesses 31141. As such, the mount portion 322 can be constrained in the recesses 31141, as shown in FIG. 4C.

Figure 5:
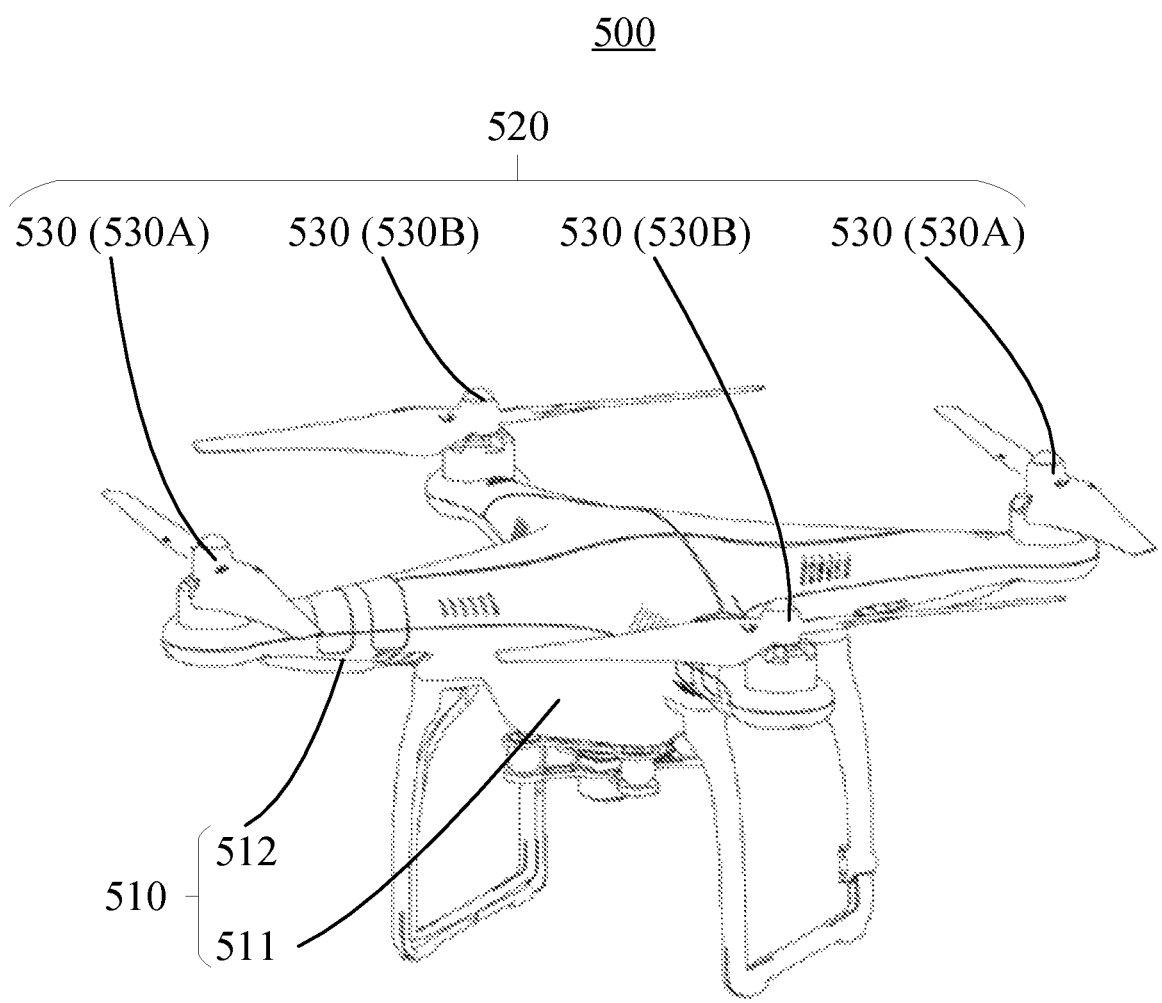
FIG. 5 schematically shows an example aerial vehicle consistent with the disclosure.

The propulsion device consistent with the disclosure, such as the propulsion device 300 described above in connection with FIG. 3, can be used in an aerial vehicle, such as an unmanned aerial vehicle (UAV), to provide lift force for the aerial vehicle. FIG. 5 schematically shows an example aerial vehicle 500 consistent with the disclosure. The aerial vehicle 500 includes a fuselage frame 510 and a propulsion system 520 coupled to the fuselage frame 510 and configured to provide lift force for the aerial vehicle 500. The fuselage frame 510 includes a vehicle body 511 and a plurality of arms 512 extending from the vehicle body 511. The vehicle body 511 can be configured to accommodate various components of the aerial vehicle 500, such as a flight controller, electronic circuitry, and/or one or more sensors. In some embodiments, a gimbal for carrying a payload, such as a camera, can be coupled to the vehicle body 511, such as arranged below the vehicle body 511.

The propulsion system 520 includes a plurality of propulsion devices 530 each arranged at or close to one end of one of the plurality of arms 512 that is distal from the vehicle body 511. Each of the propulsion devices 530 can be the same as or similar to the propulsion device 300 described above in connection with FIG. 3, and can have the same or similar components as the propulsion device 300. For example, each of the propulsion devices 530 can include a rotor mount assembly and a rotor blade assembly mounted thereto, and the rotor mount assembly can include a rotor seat and a resilient member. The rotor seat can include a base and a plurality of lock structures, such as two lock structures, each including a recess that opens towards the base and that is configured to receive a part of a mount portion of the rotor blade assembly. The resilient member is configured to provide an elastic force to the mount portion to constrain the mount portion in the corresponding recesses. Detailed descriptions of the structure, configuration, and function of various components of each of the propulsion devices 530 are omitted here.

In the example shown in FIG. 5, the aerial vehicle 500 is a four-rotor aerial vehicle including four arms 512 and four propulsion devices 530 each arranged at or close to one end of one of the four arms 512 that is distal from the vehicle body 511. In some other embodiments, the aerial vehicle 500 can be a two-rotor aerial vehicle including two propulsion devices 530, a three-rotor aerial vehicle including three propulsion devices 530, a six-rotor aerial vehicle including six propulsion devices 530, or an eight-rotor aerial vehicle including eight propulsion devices 530. In some embodiments, the plurality of propulsion devices 530 can be arranged evenly spaced apart from each other. In some embodiments, the plurality of propulsion devices 530 can be divided into two groups and the two groups can be arranged symmetric to each other with respect to a middle plane of the aerial vehicle 500.

In order to allow the aerial vehicle 500 to operate properly, for example, to balance the angular momentums created by the rotors of the plurality of propulsion devices 530 during rotation, the plurality of propulsion devices 530 should be configured to rotate in different directions while being able to generate upward thrust. For example, for the aerial vehicle 500 shown in FIG. 5, the two propulsion devices labeled 530A may need to rotate in a first direction, such as a counter-clockwise direction (seeing from above), and the two propulsion devices labeled 530B may need to rotate in a second direction that is different from the first direction, such as a clockwise direction (seeing from above). The two propulsion devices 530A are also referred to as "first-direction propulsion devices" and can provide a lift force when rotating in the first direction. The base of each of the first-direction propulsion devices can include a first-direction motor that can rotate in the first direction when operating. The two propulsion devices 530B are also referred to as "second-direction propulsion devices" and can provide a lift force when rotating in the second direction. The base of each of the second-direction propulsion devices can include a second-direction motor that can rotate in the second direction when operating.

In some embodiments, as shown in FIG. 5, the four propulsion devices 530 are arranged around the vehicle body 511 in the following order: a first-direction propulsion device 530A, a second-direction propulsion device 530B, a first-direction propulsion device 530A, and a second-direction propulsion device 530B. In some embodiments, the propulsion system 520 of the aerial vehicle 500 can include two propulsion devices, one being a first-direction propulsion device and another one being a second-direction propulsion device.

To allow the first-direction propulsion device 530A and the second-direction propulsion device 530B to both provide upward thrust while rotating in different directions, the rotor blade assembly (also referred to as "first-direction rotor blade assembly") of the first-direction propulsion device 530A and the rotor blade assembly (also referred to as "second-direction rotor blade assembly") of the second-direction propulsion device 530B may have different configurations. For example, the blades of the first-direction rotor blade assembly may tilt in a different direction than the blades of the second-direction rotor blade assembly. If a first-direction rotor blade assembly is used in a second-direction propulsion device or vice versa, a downward thrust may be generated, instead of the intended upward thrust. This would result in malfunction of the aerial vehicle 500, and may cause damages to the aerial vehicle 500.

To avoid an incorrect rotor blade assembly being used in a propulsion device, the present disclosure also provides certain fool-proofing designs that can be applied to the propulsion devices 530 of the propulsion system 520. In some embodiments, the rotor mount assembly (also referred to as "first-direction rotor mount assembly") of a first-direction propulsion device 530A can be configured to not allow the second-direction rotor blade assembly to be assembled or mounted to the first-direction rotor mount assembly. In some embodiments, the rotor mount assembly (also referred to as "second-direction rotor mount assembly") of a second-direction propulsion device 530B can be configured to not allow the first-direction rotor blade assembly to be assembled or mounted to the second-direction rotor mount assembly. In some embodiments, both the first-direction rotor mount assembly and the second-direction rotor mount assembly can be configured to not allow the other-types of rotor blade assembly to be assembled or mounted thereto. Various fool-proofing designs consistent with the disclosure are described below in more detail in connection with FIGS. 6-9.

Figure 6:
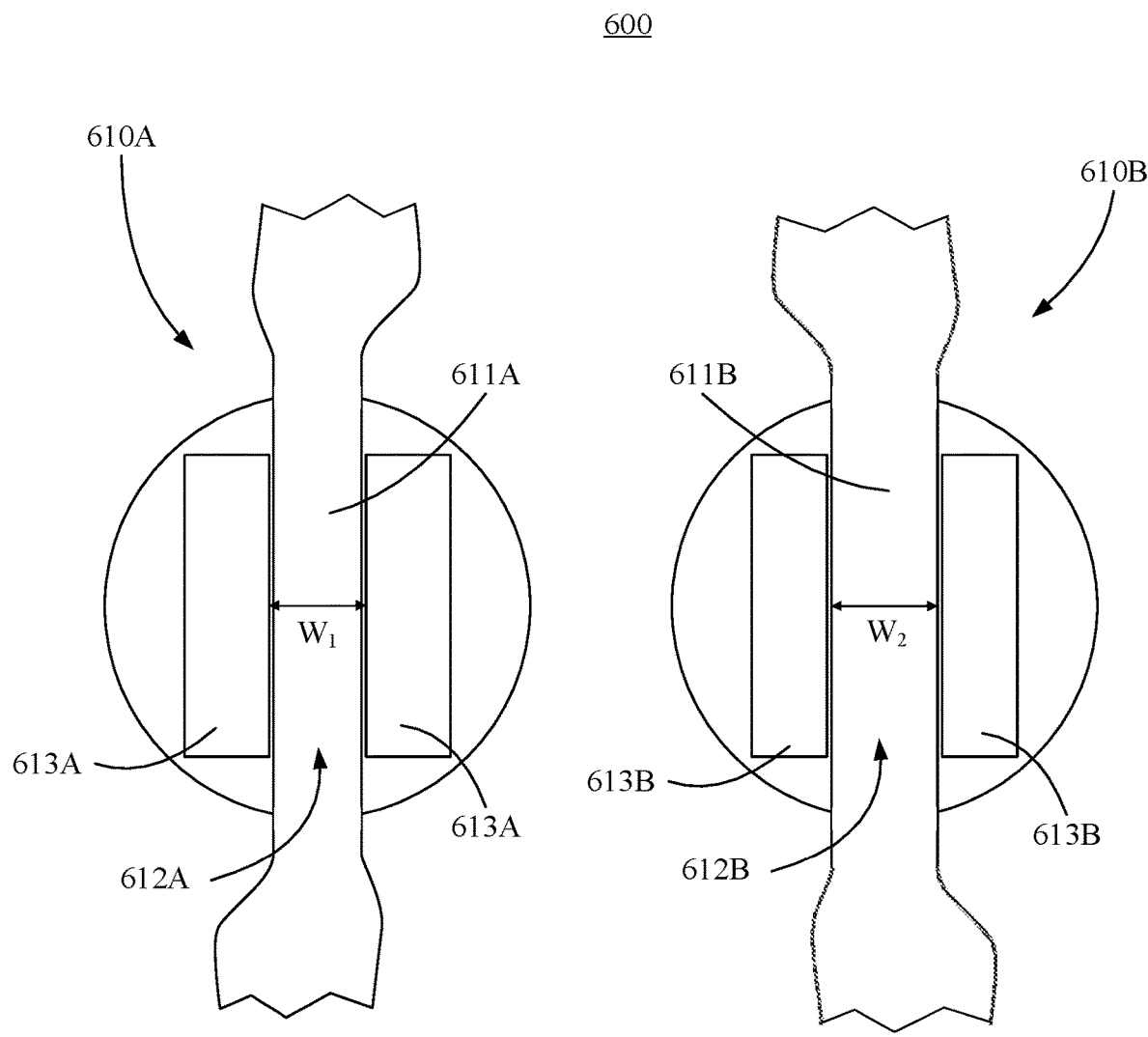
FIG. 6 schematically shows an example propulsion system having an example fool-proofing design consistent with the disclosure.

FIG. 6 schematically shows an example propulsion system 600 having an example fool-proofing design consistent with the disclosure. The propulsion system 600 includes a first propulsion device 610A and a second propulsion device 610B. The first propulsion device 610A can be one of a first-direction propulsion device and a second-direction propulsion device and the second propulsion device 610B can be the other one of the second-direction propulsion device and the second-direction propulsion device. FIG. 6 includes top views of the first propulsion device 610A and the second propulsion device 610B.

Each of the first propulsion device 610A and the second propulsion device 610B can be the same as or similar to the propulsion device 300 described above in connection with FIG. 3 or one of the propulsion devices 530 described above in connection with FIG. 5, and detailed descriptions of the same or similar components, features, and functions are omitted. As shown in FIG. 6, the first propulsion device 610A is in a state in which the mount portion 611A of the rotor blade assembly of the first propulsion device 610A is received in the opening 612A formed between the two lock structures 613A of the rotor mount assembly of the first propulsion device 610A. Similarly, the second propulsion device 610B is in a state in which the mount portion 611B of the rotor blade assembly of the second propulsion device 610B is received in the opening 612B formed between the two lock structures 613B of the rotor mount assembly of the second propulsion device 610B.

In the example shown in FIG. 6, a width $W_1$ of the opening 612A is smaller than a width W2 of the mount portion 611B. With this fool-proofing design, the possibility of mistakenly mounting the rotor blade assembly of the second propulsion device 610B to the rotor mount assembly of the first propulsion device 610A can be eliminated or at least largely reduced because the mount portion 611B may not be placed into and hence pass through the opening 612A.

Figure 7:
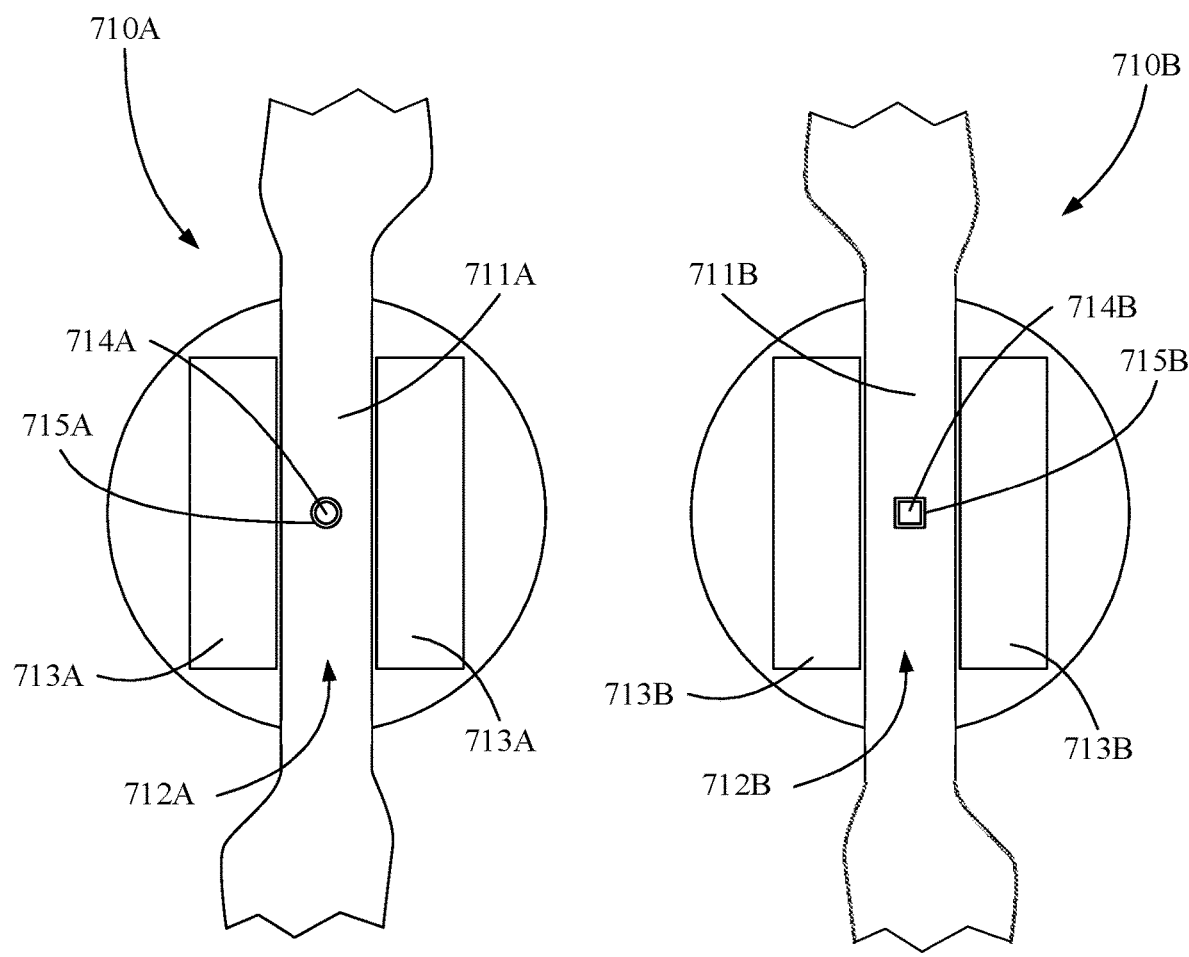
FIG. 7 schematically shows another example propulsion system having another example fool-proofing design consistent with the disclosure.

FIG. 7 schematically shows another example propulsion system 700 having another example fool-proofing design consistent with the disclosure. The propulsion system 700 includes a first propulsion device 710A and a second propulsion device 710B. The first propulsion device 710A can be one of a first-direction propulsion device and a second-direction propulsion device and the second propulsion device 710B can be the other one of the second-direction propulsion device and the second-direction propulsion device. FIG. 7 includes top views of the first propulsion device 710A and the second propulsion device 710B.

Each of the first propulsion device 710A and the second propulsion device 710B can be the same as or similar to the propulsion device 300 described above in connection with FIG. 3 or one of the propulsion devices 530 described above in connection with FIG. 5, and detailed descriptions of the same or similar components, features, and functions are omitted. As shown in FIG. 7, the first propulsion device 710A is in a state in which the mount portion 711A of the rotor blade assembly of the first propulsion device 710A is received in the opening 712A formed between the two lock structures 713A of the rotor mount assembly of the first propulsion device 710A. Similarly, the second propulsion device 710B is in a state in which the mount portion 711B of the rotor blade assembly of the second propulsion device 710B is received in the opening 712B formed between the two lock structures 713B of the rotor mount assembly of the second propulsion device 710B.

Further, the rotor mount assembly of the first propulsion device 710A includes a shaft 714A configured to be inserted into a shaft hole 715A of the rotor blade assembly of the first propulsion device 710A. The rotor mount assembly of the second propulsion device 710B includes a shaft 714B configured to be inserted into a shaft hole 715B of the rotor blade assembly of the second propulsion device 710B.

In the example shown in FIG. 7, the shaft 714A (such as the free end (mounting end) of the shaft 714A) and the shaft hole 715A have a circular shape, and the shaft 714B (such as the free end (mounting end) of the shaft 714B) and the shaft hole 715B have a rectangular shape. The shaft hole 715A is configured to not allow the shaft 714B to pass therethrough. Similarly, the shaft hole 715B is configured to not allow the shaft 714A to pass therethrough. In some embodiments, the sizes of the circular shape and the rectangular shape can be configured such that the shaft hole 715A cannot allow the shaft 714B to pass therethrough but the shaft hole 715B may allow the shaft 714A to pass therethrough, or vice versa.

The configuration of the shafts 714A, 714B and the shaft holes 715A, 715B shown in FIG. 7 and described above is merely an example for illustrative purposes. In some other embodiments, the shafts 714A, 714B and the shaft holes 715A, 715B can have other shapes, so long as at least one of the shaft holes 715A and 715B does not allow the shaft belonging to the other propulsion device to pass therethrough. The different shapes for the shaft 714A and the shaft hole 715A and the shaft 714B and the shaft hole 715B can be selected from various shapes, such as an elliptical shape, a triangular shape, a pentagonal shape, a hexagonal shape, and an octagonal shape.

Figure 8:
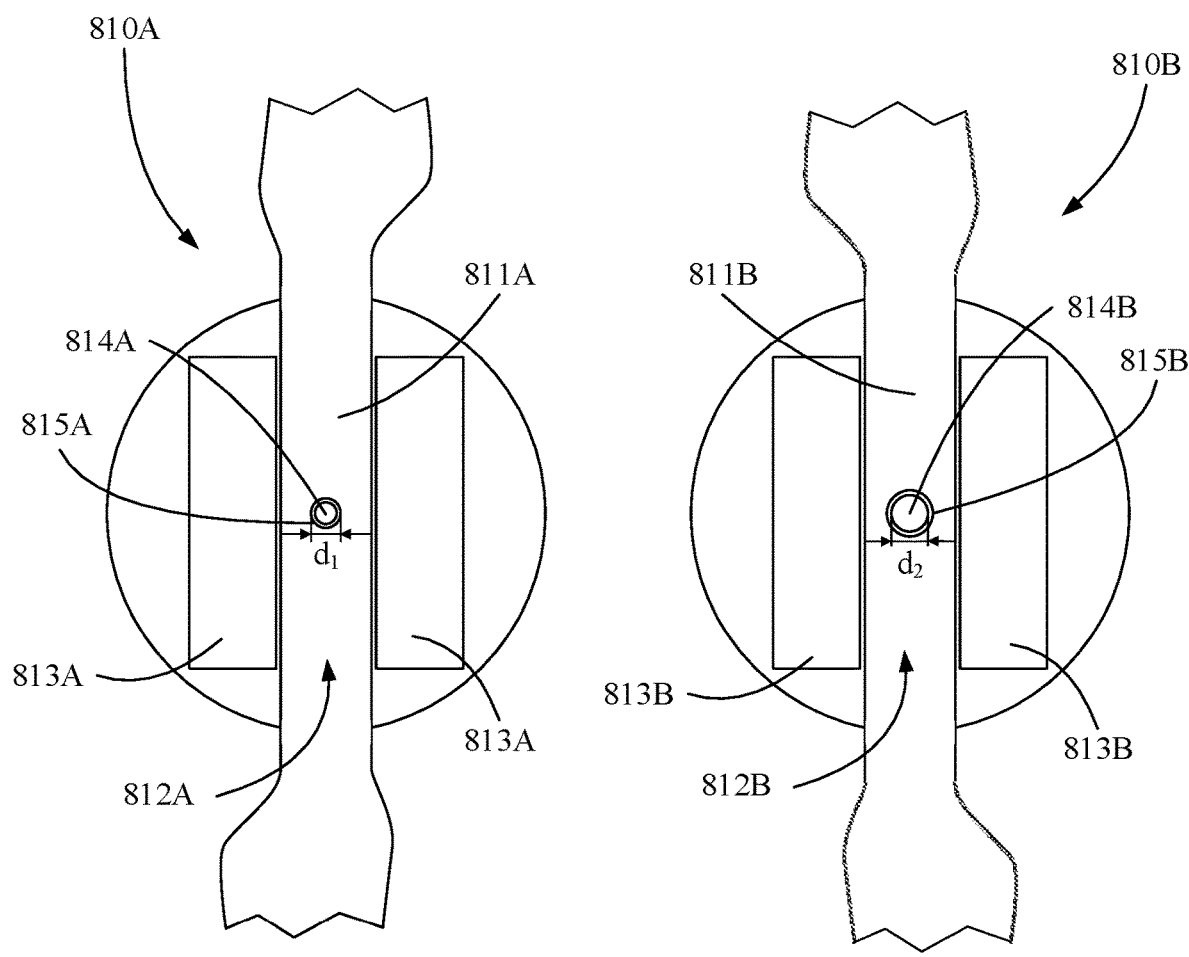
FIG. 8 schematically shows another example propulsion system having another example fool-proofing design consistent with the disclosure.

FIG. 8 schematically shows another example propulsion system 800 having another example fool-proofing design consistent with the disclosure. The propulsion system 800 includes a first propulsion device 810A and a second propulsion device 810B. The first propulsion device 810A can be one of a first-direction propulsion device and a second-direction propulsion device and the second propulsion device 810B can be the other one of the second-direction propulsion device and the second-direction propulsion device. FIG. 8 includes top views of the first propulsion device 810A and the second propulsion device 810B.

Each of the first propulsion device 810A and the second propulsion device 810B can be the same as or similar to the propulsion device 300 described above in connection with FIG. 3 or one of the propulsion devices 530 described above in connection with FIG. 5, and detailed descriptions of the same or similar components, features, and functions are omitted. As shown in FIG. 8, the first propulsion device 810A is in a state in which the mount portion 811A of the rotor blade assembly of the first propulsion device 810A is received in the opening 812A formed between the two lock structures 813A of the rotor mount assembly of the first propulsion device 810A. Similarly, the second propulsion device 810B is in a state in which the mount portion 811B of the rotor blade assembly of the second propulsion device 810B is received in the opening 812B formed between the two lock structures 813B of the rotor mount assembly of the second propulsion device 810B.

Further, similar to the first propulsion device 710A shown in FIG. 7, the rotor mount assembly of the first propulsion device 810A includes a shaft 814A configured to be inserted into a shaft hole 815A of the rotor blade assembly of the first propulsion device 810A. Similar to the second propulsion device 710B shown in FIG. 7, the rotor mount assembly of the second propulsion device 810B includes a shaft 814B configured to be inserted into a shaft hole 815B of the rotor blade assembly of the second propulsion device 810B.

Different from the propulsion system 700 shown in FIG. 7, in the example propulsion system 800 shown in FIG. 8, the shaft 814A (such as the free end (mounting end) of the shaft 814A), the shaft hole 815A, the shaft 814B (such as the free end (mounting end) of the shaft 814B), and the shaft hole 815B have a same shape, such as a circular shape as shown in FIG. 8. However, the diameter $d_1$ of the shaft hole 815A is smaller than a diameter $d_2$ of the shaft 814B. As such, the shaft hole 815A will not allow the shaft 814B to pass therethrough.

The configuration of the shafts 814A, 814B and the shaft holes 815A, 815B shown in FIG. 8 and described above is merely an example for illustrative purposes. In some other embodiments, the shafts 814A, 814B and the shaft holes 815A, 815B can have another shape, so long as the size of at least one of the shaft holes 815A and 815B does not allow the shaft belonging to the other propulsion device to pass therethrough. The shape can be selected from various shapes, such as an elliptical shape, a triangular shape, a rectangular shape, a pentagonal shape, a hexagonal shape, and an octagonal shape. For example, the shafts 814A, 814B and the shaft holes 815A, 815B can all have a triangular shape, a rectangular shape, a pentagonal shape, a hexagonal shape, or an octagonal shape, and the length of a side of one of the shaft holes 815A and 815B is smaller than the length of a corresponding side of the shaft belonging to the other propulsion device.

Figure 9A:
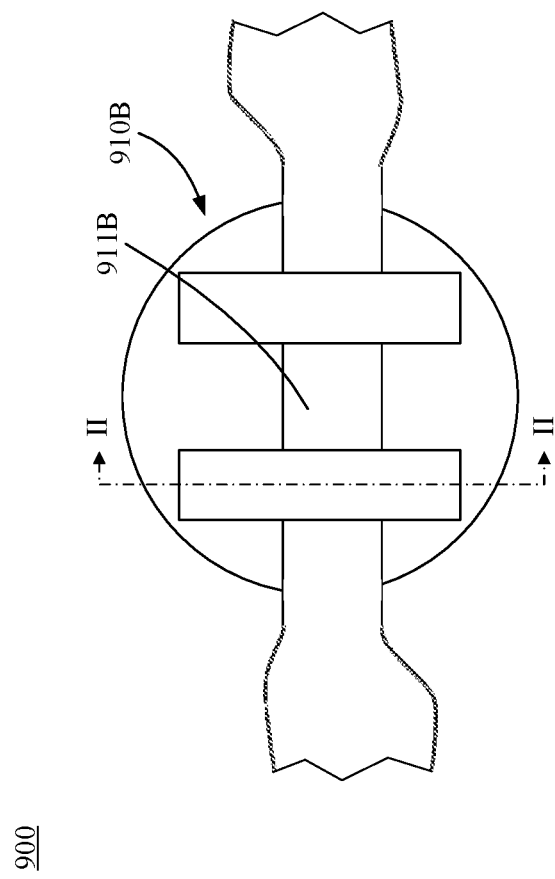
FIGS. 9A and 9B schematically show another example propulsion system having another example fool-proofing design consistent with the disclosure.
Figure 9A:
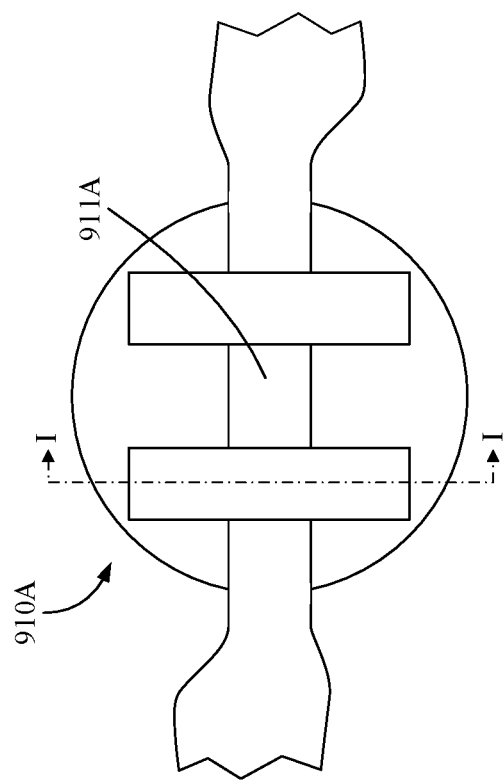
Figure 9B:
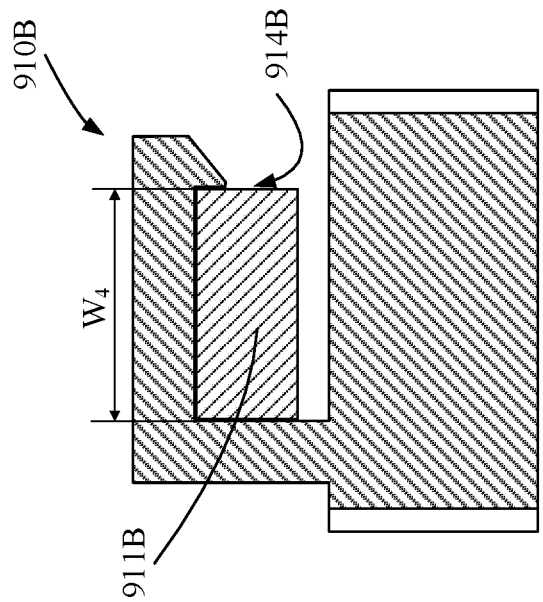
Figure 9B:
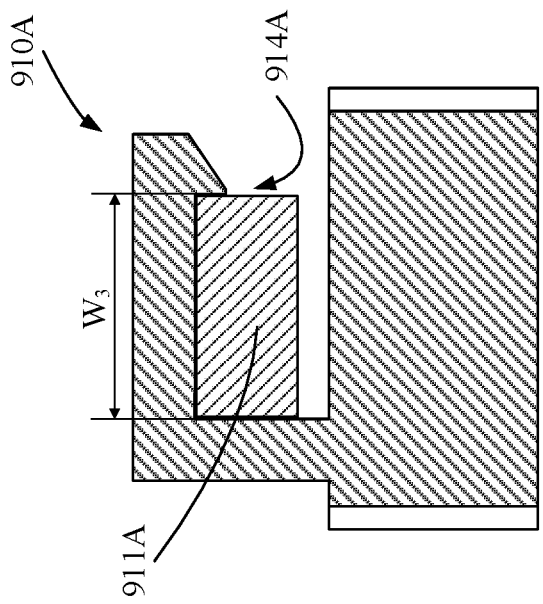

FIGS. 9A and 9B schematically show another example propulsion system 900 having another example fool-proofing design consistent with the disclosure. The propulsion system 900 includes a first propulsion device 910A and a second propulsion device 910B. The first propulsion device 910A can be one of a first-direction propulsion device and a second-direction propulsion device and the second propulsion device 910B can be the other one of the second-direction propulsion device and the second-direction propulsion device. FIG. 9A includes top views of the first propulsion device 910A and the second propulsion device 910B. FIG. 9B includes the cross-sectional view of the first propulsion device 910A along line I-I and the cross-sectional view of the second propulsion device 910B along line II-II.

Each of the first propulsion device 910A and the second propulsion device 910B can be the same as or similar to the propulsion device 300 described above in connection with FIG. 3 or one of the propulsion devices 530 described above in connection with FIG. 5, and detailed descriptions of the same or similar components, features, and functions are omitted. As shown in FIGS. 9A and 9B, the first propulsion device 910A is in a state in which the mount portion 911A of the rotor blade assembly of the first propulsion device 910A is received and constrained in the recesses 914A of the lock structures of the rotor mount assembly of the first propulsion device 910A. Similarly, the second propulsion device 910B is in a state in which the mount portion 911B of the rotor blade assembly of the second propulsion device 910B is received in the recesses 914B of the lock structures of the rotor mount assembly of the second propulsion device 910B.

In the example shown in FIGS. 9A and 9B, a width $W_3$ of the recesses 914A is smaller than a width $W_4$ of the mount portion 911B. With this fool-proofing design, the possibility of mistakenly mounting the rotor blade assembly of the second propulsion device 910B to the rotor mount assembly of the first propulsion device 910A can be eliminated or at least largely reduced because the mount portion 911B may not be placed into and hence be constrained in the recesses 914A.

In some embodiments, the fool-proofing designs described above in connection with FIGS. 6, 7, 8, 9A, and 9B can be combined in any proper manner. Two or more such fool-proofing designs can be used in the same propulsion system consistent with the disclosure.

The processes shown in the figures associated with the method embodiments can be executed or performed in any suitable order or sequence, which is not limited to the order and sequence shown in the figures and described above. For example, two consecutive processes may be executed substantially simultaneously where appropriate or in parallel to reduce latency and processing times, or be executed in an order reversed to that shown in the figures, depending on the functionality involved.

Further, the components in the figures associated with the device embodiments can be coupled in a manner different from that shown in the figures as needed. Some components may be omitted and additional components may be added.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An unmanned aerial vehicle (UAV) comprising:
a fuselage frame; and
a propulsion system coupled to the fuselage frame and including:
  a first propulsion device including:
    a first rotor blade assembly including a first portion connecting two first blades; and
    a first rotor mount assembly including:
      a first rotor seat including:
        a first base;
        a first lock structure protruding from an upper surface of the first base, the first lock structure including a first recess opening towards the upper surface of the first base and configured to receive a first part of the first portion, the first part of the first portion being above the upper surface, and an uppermost surface of the first portion being not higher than a top surface of the first lock structure; and
        a second lock structure arranged at the first base, the second lock structure including a second recess opening towards the first base and configured to receive a second part of the first portion, and the uppermost surface of the first portion being not higher than a top surface of the second lock structure; and
      a first resilient member configured to provide an elastic force to the first portion to constrain the first portion in the first recess and the second recess; and
  a second propulsion device including:
    a second rotor blade assembly including a second portion; and
    a second rotor mount assembly including:
      a second rotor seat including:
        a second base;
        a third lock structure arranged at the second base, the third lock structure including a third recess opening towards the second base and configured to receive a first part of the second portion; and
        a fourth lock structure arranged at the second base, the fourth lock structure including a fourth recess opening towards the second base and configured to receive a second part of the second portion; and
      a second resilient member configured to provide an elastic force to the second portion to constrain the second portion in the third recess and the fourth recess;
    wherein the first rotor mount assembly is configured to not allow the second rotor blade assembly to be assembled to the first rotor mount assembly.

2. The UAV of claim 1, wherein the second rotor mount assembly is configured to not allow the first rotor blade assembly to be assembled to the second rotor mount assembly.

3. The UAV of claim 1, wherein:
the first rotor blade assembly is configured to provide a lift force when rotating in a first direction;
the second blade assembly is configured to provide a lift force when rotating in a second direction opposite to the first direction;
the first base includes a first motor; and
the second base includes a second motor.

4. The UAV of claim 1, wherein a width of the first recess and a width of the second recess are smaller than a width of the second portion.

5. The UAV of claim 1, wherein:
the first lock structure and the second lock structure are spaced apart from each other to form an opening between the first lock structure and the second lock structure; and
a width of the opening is smaller than a width of the second portion.

6. The UAV of claim 1, wherein: the first rotor mount assembly further includes a shaft arranged at a center of the first base; the second rotor blade assembly includes a shaft hole at the second portion; and at least one of a size or a shape of the shaft hole is configured to not allow the shaft to pass through the shaft hole.

7. The UAV of claim 6, wherein both the shaft and the shaft hole have a round shape, and a diameter of the shaft is larger than a diameter of the shaft hole.

8. The UAV of claim 1, wherein the first resilient member is configured to, when the first rotor blade assembly is held by the first recess and the second recess, push the first rotor blade assembly against a bottom surface of the first recess and a bottom surface of the second recess.

9. The UAV of claim 1, wherein:
a width of the first recess, a width of the second recess, and a width of the first portion approximately equal each other;
a first depth of the first recess approximately equals a second depth of the second recess; and
the first depth and the second depth are larger than a thickness of the first portion.

10. The UAV of claim 1, wherein the first lock structure and the second lock structure are spaced apart from each other to form an opening between the first lock structure and the second lock structure, a width of the opening approximately equaling a width of the first portion.

11. The UAV of claim 1, wherein the first portion includes a center part of the first rotor blade assembly configured to engage the first rotor mount assembly.

12. The UAV of claim 1, wherein: the first rotor mount assembly further includes a shaft arranged at a center of the first base; and the first rotor blade assembly includes a shaft hole at the first portion, the shaft hole being configured to receive the shaft.

13. The UAV of claim 1, wherein:
the first rotor blade assembly includes a foldable blade assembly; and the two first blades are configured to extend in opposite directions when the foldable blade assembly is in an extended state and in an approximately same direction when the foldable blade assembly is in a folded state.

14. The UAV of claim 1, wherein:
the fuselage frame includes:
  a vehicle body; and
  at least two arms extending from the vehicle body; and
each of the first propulsion device and the second propulsion device is arranged at one end of one of the at least two arms that is distal from the vehicle body.

15. The UAV of claim 14, wherein:
the at least two arms include four arms extending from the vehicle body;
the propulsion system further includes:
  a third propulsion device, the first propulsion device and the third propulsion device having an approximately same structure and being configured to rotate in a first direction; and
  a fourth propulsion device, the second propulsion device and the fourth propulsion device having an approximately same structure and being configured to rotate in a second direction opposite to the first direction;
each of the first propulsion device, the second propulsion device, the third propulsion device, and the fourth propulsion device is arranged at one end of one of the four arms that is distal from the vehicle body; and
the first propulsion device, the second propulsion device, the third propulsion device, and the fourth propulsion device are arranged around the vehicle body in that order.

16. The UAV of claim 1, wherein:
a width of the first portion received in the first recess and the second recess is different from a width of the second portion received in the third recess and the fourth recess, to cause the first rotor mount assembly to be configured to not allow the second rotor blade assembly to be assembled to the first rotor mount assembly; and/or
a distance between the first lock structure and the second lock structure is different from a distance between the third lock structure and the fourth lock structure, to cause the first rotor mount assembly to be configured to not allow the second rotor blade assembly to be assembled to the first rotor mount assembly.

17. The UAV of claim 1, wherein the first portion directly abuts the first resilient member.

18. The UAV of claim 1, wherein:
the first recess includes a first bottom surface and two first sides extending from the first bottom surface towards the upper surface of the first base, the first bottom surface being substantially parallel to a plane of rotation of the first rotor mount assembly; and/or
the second recess includes a second bottom surface and two second sides extending from the second bottom surface towards the upper surface of the first base, the second bottom surface being substantially parallel to the plane of rotation of the first rotor mount assembly.

19. The UAV of claim 1, wherein:
the first portion is in a bar shape.

20. The UAV of claim 1, wherein the first portion includes a first cover and a second cover, the first cover and the second cover are connected to each other, each of the two first blades being sandwiched between the first cover and the second cover, and projections of the first cover and the second cover in a vertical direction are identical to each other, the vertical direction being parallel to an axis of rotation of the first rotor blade assembly.

* * * * *